(12) United States Patent
Schievelbusch

(10) Patent No.: US 8,132,763 B2
(45) Date of Patent: Mar. 13, 2012

(54) AIRCRAFT HIGHLIFT SYSTEM

(75) Inventor: Bernd Schievelbusch, Lindenberg (DE)

(73) Assignee: Liebherr-Aerospace Lindenberg GmbH, Lindenberg/Allgau (DE)

( * ) Notice: Subject to any disclaimer, the term of this patent is extended or adjusted under 35 U.S.C. 154(b) by 528 days.

(21) Appl. No.: 12/283,888

(22) Filed: Sep. 16, 2008

(65) Prior Publication Data

US 2009/0146015 A1    Jun. 11, 2009

(30) Foreign Application Priority Data

Sep. 19, 2007    (DE) .......................... 10 2007 044 642

(51) Int. Cl.
*B64C 3/50* (2006.01)
(52) U.S. Cl. ...................................... 244/215; 244/99.3
(58) Field of Classification Search ................ 244/76 A, 244/76 R, 99.3, 211–213, 215–217; 475/74, 475/248, 249; 74/665 R, 665 A, 665 B, 665 F, 74/665 G, 665 GA, 665 GB, 665 GC, 665 GD
See application file for complete search history.

(56) References Cited

U.S. PATENT DOCUMENTS

| | | | | |
|---|---|---|---|---|
| 3,263,946 | A * | 8/1966 | Roberts et al. ................ | 244/213 |
| 3,662,550 | A | 5/1972 | Lichtfuss | |
| 3,935,754 | A * | 2/1976 | Comollo ...................... | 74/665 F |
| 4,260,121 | A * | 4/1981 | Baston et al. ................. | 244/213 |
| 4,428,249 | A * | 1/1984 | Henk ........................ | 74/412 TA |
| 4,575,027 | A | 3/1986 | Cronin | |
| 4,745,815 | A | 5/1988 | Klopfenstein | |
| 4,786,013 | A * | 11/1988 | Pohl ............................. | 244/99.2 |
| 4,904,999 | A * | 2/1990 | Klansnic et al. .............. | 340/945 |
| 5,071,397 | A | 12/1991 | Grimm | |
| 5,686,907 | A * | 11/1997 | Bedell et al. .................. | 340/945 |
| 6,588,704 | B2 * | 7/2003 | Rodrigues ................... | 244/76 R |
| 7,114,601 | B2 | 10/2006 | Mayer | |

(Continued)

FOREIGN PATENT DOCUMENTS

DE             103 08 301 B3        7/2004

(Continued)

OTHER PUBLICATIONS

Search Report of the corresponding German Application No. EP 08 016481, Dated Apr. 18, 2011.

*Primary Examiner* — Timothy D Collins
*Assistant Examiner* — Jamie S Stehle
(74) *Attorney, Agent, or Firm* — Dilworth & Barrese, LLP

(57) ABSTRACT

The present invention relates to an aircraft high-lift system with at least one drive unit for operating the high-lift systems of the half wings (half-wing systems) and with at least one overload protection to avoid undesirably high operating torques in the half-wing systems, wherein the overload protection includes a comparator, by means of which the instantaneous values of the operating torques of the half-wing systems are compared and/or a condition caused by the difference of the operating torques is detected, and a limiter connected with the comparator, by means of which the drive unit is blocked, shut down or deactivated, and/or the torque of the drive unit is dissipated into the aircraft structure, when the difference of the operating torques determined in the comparator exceeds a limit value.

20 Claims, 2 Drawing Sheets

U.S. PATENT DOCUMENTS

| | | |
|---|---|---|
| 2004/0200677 A1 | 10/2004 | Mayer et al. |
| 2004/0251382 A1* | 12/2004 | Schievelbusch ............ 244/75 R |
| 2005/0011307 A1* | 1/2005 | Gmirya .................... 74/665 GA |
| 2005/0029407 A1* | 2/2005 | Pohl et al. ..................... 244/221 |
| 2006/0060719 A1* | 3/2006 | Hauber et al. ................ 244/194 |
| 2007/0080261 A1 | 4/2007 | Neumann et al. |
| 2007/0176051 A1* | 8/2007 | Good et al. ................... 244/215 |

FOREIGN PATENT DOCUMENTS

| | | |
|---|---|---|
| DE | 103 53 672 A1 | 6/2005 |
| DE | 10 2004 055740 A1 | 1/2006 |
| EP | 1 052 168 A2 | 11/2000 |
| EP | 1 321 359 A2 | 6/2003 |

* cited by examiner

AIRCRAFT HIGHLIFT SYSTEM

The present invention relates to an aircraft high-lift system with at least one drive unit for operating the high-lift systems of the half wings and with at least one overload protection to avoid undesirably high operating torques in the half-wing systems.

BACKGROUND OF THE INVENTION

Drive systems for instance for slats and landing flaps on aircraft wings frequently consist of a central drive unit, which is arranged for instance in the fuselage of the aircraft. Via a branching transmission, the central drive unit is connected with transmission shafts in the half wings, which in turn transmit the torque to the flaps via branch transmissions. Downstream of the branch transmissions, actuators and guide transmissions are provided, which move the aerodynamically acting flaps.

Considering the torque level per half wing from outside, i.e. from the wing tip inwards to the wing root, the torque level in the transmission shafts is increased at each load station by the torque branched off there. Thus, at each root-side shaft end, half the operating torque of the drive unit acts, which drive unit usually supplies both half wings with the required torque.

In general, the central drive unit is designed for the maximum occurring operating torque at nominal speed, and after reaching and exceeding the nominal output point, a torque excess except for the blocking torque (stalling torque) becomes effective with decreasing speed. Hence a conventionally designed drive unit has about three times the torque potential than is required for moving a half wing.

Faults occurring in the half wings, which should rather be detected immediately, include the so-called jamming case (jam), i.e. the jamming of a component of the power train or of the flap itself, and the shaft breakage, which leads to the fact that flaps behind the breakage point no longer can be positioned correctly, which can lead to an asymmetric fault.

Without use of a torque limiter, the full stalling torque of the drive unit develops in a jamming case in the series of the power-transmitting components between the central drive unit and the jamming point, which leads to the fact that the entire stalling torque or the actuating force resulting from the stalling torque acts at the jamming point itself, which can lead to a damage of the components to which the torque is applied. Therefore, it is known from the prior art to use torque limiters, by means of which the high component loads can be prevented. By means of the torque limiters, the downstream components of the branch transmission, of the guide transmission and of the structural components are protected against these extreme loads.

These station torque limiters have the effect that they dissipate the torque of the drive unit into the wing structure. The response value of these so-called station torque limiters generally is about 130% of the maximum admissible operating torque of the station.

For lowering the torque level, it is furthermore known from the prior art to incorporate so-called branch torque limiters or also half-system torque limiters in the transmissions behind the branching point, but close to the root, which subsequently are also referred to as half-wing torque limiters. The same are actuated by the station torque limiters. Their response value generally is about 130% of the maximum accumulated operating torque of the half wing.

Aircraft high-lift systems with overload protection are known from the prior art.

DE 103 53 672 A1 describes a system, in which a jamming case is detected by comparing the conditions in the left and right wings. The instantaneous conditions of position, speed, acceleration or output power of drive units are indicated as characteristics to be observed. If a jamming case is detected in this way, the drive unit is deactivated, so that a further torque increase in the transmission system is limited.

From DE 10 2004 055 740 A1, an aircraft high-lift system with overload protection is known. What is provided is the use of a signal generated by means of an electromechanical switching device, which indicates that the threshold value of the operating torque is exceeded in the transmission of the half wing close to the root. If a jamming case in the power train of a half wing is detected in this way, the drive unit is deactivated. Said threshold value lies above the maximum operating torque of the half wing.

DE 103 08 301 likewise describes an aircraft high-lift system with overload protection. In this system, the drive unit is deactivated between the actuator and the guide transmission after a threshold value of the continuously measured actuating force is exceeded.

EP 1 321 359 B1 discloses the constructive features of a differential torque limiter.

As explained above, a further case of fault consists in the occurrence of a shaft breakage (disconnect). A shaft breakage leads to a so-called asymmetric fault, which is problematic in particular because the unsymmetric variation of the uplift and resistance forces on the wings cannot be compensated with the primary flight control surfaces (ailerons). Asymmetry can result from an interruption (disconnect) at an arbitrary point in the transmission system, whereby the flaps or landing flaps no longer can be positioned in a controlled way behind the breakage point.

For detecting the shaft breakage, it is provided in the prior art that the positions of the shaft systems in the left and right wings are measured and compared continuously. When a threshold value of the position difference is exceeded, an interruption (disconnect) is assumed in the power train, and the system is shut down.

FIG. 5 shows an aircraft high-lift system with overload protection known from the prior art.

The drive power of the central drive unit 1 is delivered via the central shaft 2 to the branching transmission 3. In the branching transmission 3, the drive power is distributed into the transmissions 5 of the left and right half wings. For reasons of simplicity, only the components of the right half wing are provided with reference numerals in FIG. 5. The left half wing has a mirror-symmetrically identical construction.

In the jamming case, the half-system torque limiter 4 protects the succeeding elements of the half wing against inadmissibly high loads. Behind the same, the branching transmissions 6 are provided, which take the power necessary for moving the actuators 8 from the transmission line 5. The actuators 8 convert the rotation of the branch transmissions 6 into translatory actuating movements. By means of the guide transmissions 9, the actuating force is transmitted to the respective landing flap 10. Furthermore, they determine the kinematic course of the actuating process.

As can furthermore be taken from FIG. 5, station torque limiters 7 are provided at the outlet of the branch transmissions 6, which protect the components of the station against inadmissibly high loads.

If jamming occurs for instance in the guide transmission 9 of the outer right-hand station, the load in the associated actuator 8 will rise, until the station torque limiter 7 of this station responds and dissipates the driving torques into the structure. Since the drive unit 1 continues to operate, however, the torque in the transmission line 5 continues to rise, until the half-wing torque limiter 4 responds and dissipates the driving torque into the structure.

In this condition, the system is blocked, and in the transmission line 5 between drive unit 1 and half-wing torque limiter 4, the stalling torque, i.e. the maximum possible operating torque is constrained. Between half-wing torque limiter 4 and station torque limiter 7, a torque of about 130% of the maximum half-wing operating torque is constrained, and in the line between station torque limiter 7 and the jamming point about 130% of the maximum station torque and/or of the actuating force resulting therefrom.

Such system operates with both uncontrolled and controlled drive units.

As explained above and shown in FIG. 5, a system topology in accordance with the prior art thus includes a multitude of complex mechanical devices, which increase the system price and the weight, and at the same time impair the system availability also because of the increased complexity, for protecting components against excessive torques/actuating forces.

SUMMARY OF THE INVENTION

Therefore, it is the object underlying the present invention to provide an aircraft high-lift system with overload protection, whose complexity is reduced as compared to prior art systems.

This object is solved by an aircraft high-lift system with the features herein.

Accordingly, it is provided that the overload protection includes a comparator, by means of which the instantaneous values of the operating torques of the half-wing systems are compared or a condition caused by the difference of the operating torques is detected, and a limiter connected with the comparator, by means of which the drive unit is blocked, shut down or deactivated, and/or the torque of the drive unit is dissipated into the aircraft structure, when the difference of the operating torques exceeds a limit value.

In accordance with the invention, it thus is provided that the difference of the operating torques of the half-wing systems is compared or that a condition caused by the difference of the operating torques is detected, and that on this basis a further increase of the operating torque possibly is prevented or minimized.

It is conceivable that in each half wing at least one torque sensor is provided, which is connected with the comparator.

The torque sensor(s) can be arranged at the root-side ends of the half wings. In principle, another arrangement of the torque sensors is also possible.

The comparator can be formed by an electronic evaluation unit which is connected with the drive unit and deactivates the same, when it is detected in the electronic evaluation unit that the difference of the torques exceeds a limit value.

A low system complexity is obtained when no half-wing torque limiters and/or no station torque limiters are provided.

The comparator and the limiter can be formed by two different components or by one and the same component or also by an assembly.

The comparator can be configured as a substantially mechanically operating component.

It can be provided that the comparator includes first wheels, at least one of which each is connected with one of the transmission shafts. Said first wheels can be arranged in the root-side ends of the transmissions. They mesh with second wheels, which are stationarily mounted on an axially movable pinion shaft, wherein the first wheels are configured such that they exert oppositely directed forces on the pinion shaft.

Preferably, the first wheels and/or the second wheels are helical spur gears.

By means of springs acting in opposite directions, the pinion shaft can be biased. It can be provided that minor torque differences are reacted by the springs and the system only responds when the torque difference assumes higher values.

It is conceivable that one or more sensors or contacts are provided, by means of which an axial deflection of the pinion shaft or of a component connected with the same can be detected. If the pinion shaft is axially deflected beyond a specified extent, this leads to the fact that the sensor or the contact responds and leads to a shutdown of the drive unit.

Alternatively or in addition, it is conceivable that the axial deflection of the pinion shaft leads to the actuation of a brake, for instance of a mechanical brake, which blocks the drive unit. The operating torque is dissipated into the structure.

In this configuration, the system of the invention can also detect an interruption in one of the power trains by monitoring the torque difference both by using an electronically operating comparator unit and by using a mechanical comparator unit, as in such case the operating torque in the line is reduced by the amount of the system part separated. This detection is effected with a distinctly smaller position difference of the two system halves than in the systems known from the prior art.

System topologies are known, which require redundant load paths at the load stations. This requirement is satisfied by the parallel arrangement of two actuators and possibly also of two guide transmissions.

A possible disadvantage of such system arrangement consists in that a force conflict can occur between the power trains, which is caused by tolerances in the load-bearing components and which cannot be compensated because of the closed torque circuit. In principle, this problem can be solved by a differential transmission in the branch transmission (DE 10 2004 047 098 A1), but a disadvantage consists in that a differential transmission is comparatively complex in technical terms.

Thus, it is provided in a further aspect of the present invention that in one, several or all branch transmissions of redundant load paths the comparator is arranged. This comparator can for instance be the device shown in FIG. 3, i.e. a mechanical device. In this aspect of the invention, the branch transmissions also can include the inventive limiters.

This invention is not limited to the comparison of the operating torques between the two half wings, but also covers the comparison of operating torques within a half wing.

The comparator can also be formed by an electric evaluation unit, as disclosed herein.

BRIEF DESCRIPTION OF THE DRAWINGS

Further details and advantages of the invention will be explained in detail with reference to an embodiment illustrated in the drawing, in which.

DESCRIPTION OF THE PREFERRED EMBODIMENTS

In FIGS. 1, 2, 4 and 5, the elements of a high-lift system essential for the invention are represented schematically. All elements of the system which do not directly contribute to a realization of the overload/asymmetry protection are not illustrated. For reasons of clarity, a very simple system is shown, but the invention is applicable to more complex systems both of the trailing-edge flaps and of the slat systems.

Figure 1:
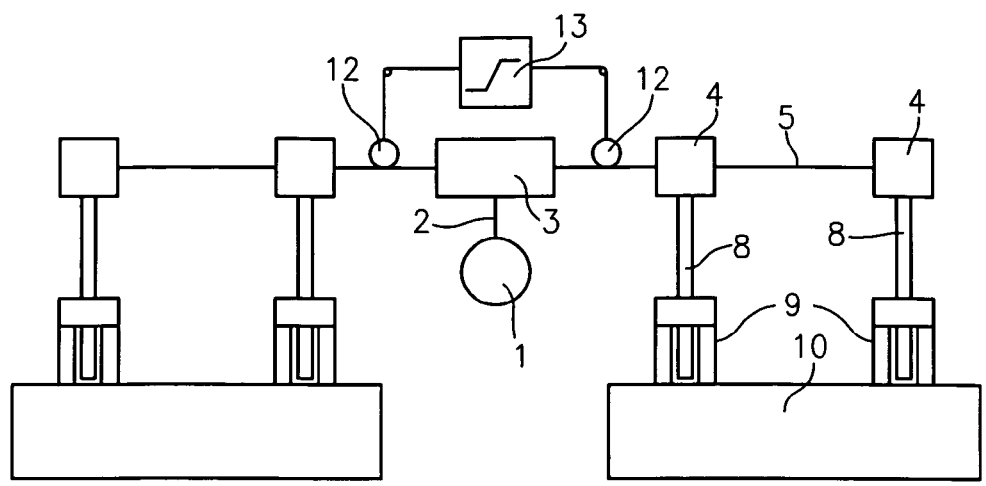
FIG. 1: shows a schematic representation of a drive system in accordance with the present invention with an electronic torque limiter.

FIG. 1 shows a drive system with an overload protection in accordance with the invention.

As can be taken from FIG. 1, the half-system torque limiters known from the prior art and the station torque limiters are not present.

Reference numeral 1 designates a central drive unit, which serves to adjust the landing flaps 10 of both wings of an aircraft. In principle, the present invention is not limited to landing flaps, but comprises the actuation and fault detection of any kind of flaps or flap systems.

The drive unit 1 drives a central shaft 2, which is connected with the branching transmission 3. By means of the branching transmission 3, the drive power of the drive unit 1 is distributed into the transmissions 5 of both wing halves illustrated. The branch transmissions 4 take the power necessary for moving the actuators 8 from the transmission. By means of the actuators 8, the rotary movement of the branch transmissions 4 is converted into a translatory movement.

Reference numeral 9 designates guide transmissions, by means of which the actuating force is transmitted to the landing flap 10. Furthermore, the guide transmissions 9 determine the kinematic course of the actuation of the landing flap 10.

As can also be taken from FIG. 1, sensors 12 are arranged at the root-side ends of the transmissions 5 of both half wings, by means of which the current torque is measured continuously in both half wings. It is conceivable, for instance, to use torque sensors, as they are known for instance from DE 103 53 672 A1.

The values of the torques measured by means of the sensors 12 are transmitted to an electronic evaluation unit 13, which forms the difference of both torques. If it is detected in the evaluation unit 13, that the difference exceeds a certain limit value, the drive unit 1 is shut down and a shutdown algorithm is initiated.

If a torque difference which exceeds a limit value is detected in the evaluation unit 13, a jamming case thus is inferred, i.e. the occurrence of the jamming of one or more of the power-transmitting components. Due to the deactivation of the drive unit 1, a further torque increase will occur between the drive unit 1 and the jamming point, but the same is smaller than is known from the prior art, which is due to the fact that the beginning of jamming is detected much earlier by the configuration of the system in accordance with the invention.

As compared to the systems known from DE 10 2004 055 740 A1 and DE 103 08 301 B3, the beginning of jamming is detected much earlier, because the difference of the operating torques is detected independent of the instantaneous value. As compared to DE 10 2004 055 740 A1 and DE 103 08 301 B3, a lower maximum torque load of the elements of the drive system thus can be realized.

Figure 2:
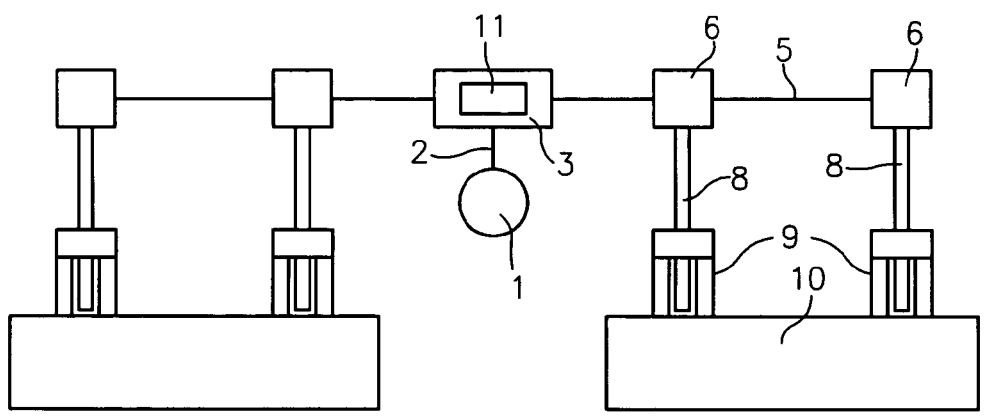
FIG. 2: shows a schematic representation of a drive system in accordance with the present invention with a mechanically acting torque limiter.

FIG. 2 shows a drive system in accordance with the present invention likewise without half-system torque limiter and without station torque limiter. In contrast to the system of FIG. 1, a mechanically acting torque limiter 11 is provided. The same is integrated in the branching transmission 3. As soon as a certain difference in the operating torques occurs in the transmission shafts 5 of the half wings, the torque limiter 11 dissipates the driving torque of the drive unit 1 into the structure.

If a jamming case occurs, the following situation exists after the standstill of the system.

Between the drive unit 1 and the branching transmission 3, the stalling torque, i.e. the maximum blocking torque in the case of jamming, is present in the central drive shaft 2.

In the transmission line up to the jamming point, the operating torque acting last is present, which is increased by the response value of the torque limiter 11. In the transmission line in which there is no jamming point, the operating torque acting last is present.

Figure 5:
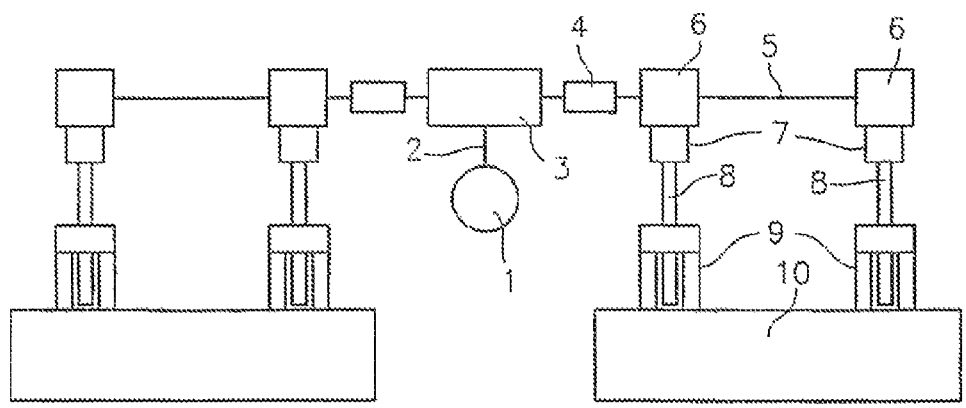
FIG. 5: shows a schematic representation of a drive system in accordance with the prior art.

The stationary and transient operating loads are reduced in the system topology shown in FIG. 2 as compared to the system architectures shown in FIG. 5.

Due to the fact that the torque limiter operates mechanically, the system shown in FIG. 2 can be used both with controlled and with uncontrolled drive units.

If a shaft breakage occurs, a torque difference with opposite signs occurs due to the absence of the station torques.

Figure 3:
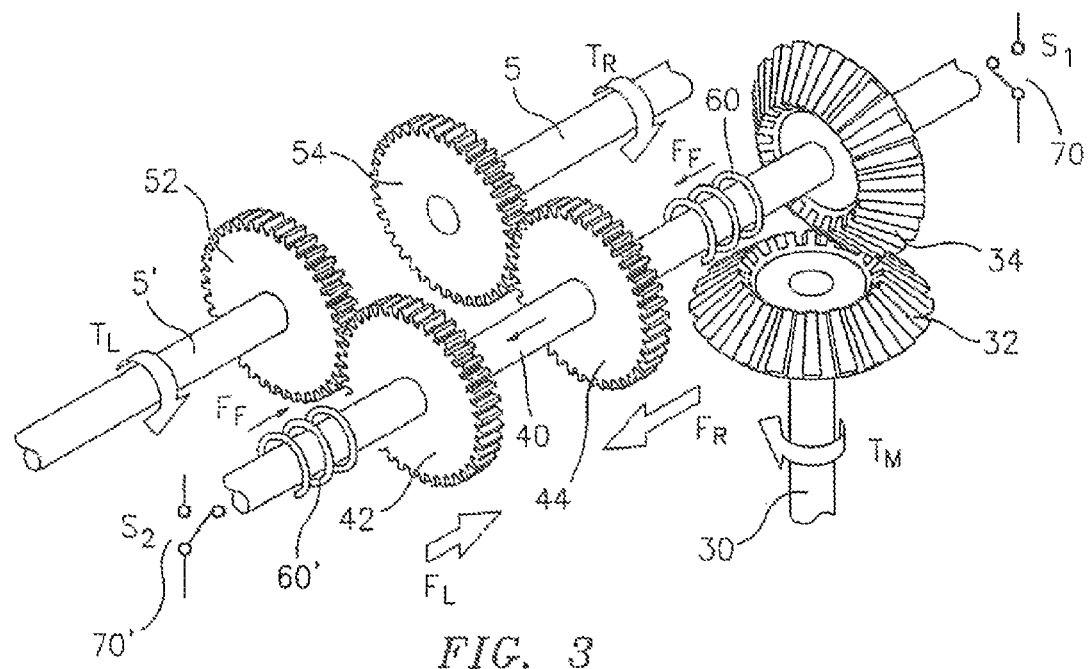
FIG. 3: shows a schematic representation of a mechanically acting torque limiter.

FIG. 3 shows a branching transmission 3 with integrated mechanically acting torque limiter, which is used in a system topology as shown in FIG. 2.

As can be taken from FIG. 3, the torques of the left half wing ($T_L$) and of the right half wing ($T_R$) are transmitted to the firmly connected pinions, added up in the pinion shaft and transmitted to the motor shaft via the axially stationary pair of bevel gears.

In detail, the following applies:

The branching transmission 3 includes a motor shaft 30, whose power and/or whose torque is transmitted to the axially movably mounted pinion shaft 40 via the stationary pair of bevel gears 32, 34. Two stationarily mounted pinions 42, 44 helically toothed on their end face are disposed on the pinion shaft 40. The same mesh with two helical spur gears 52, 54, of which one is connected with the transmission shaft 5 of the right half wing and one is connected with the transmission shaft 5' of the left half wing.

The torques occurring in the transmissions 5, 5' are designated with the reference numerals $T_R$ and $T_L$.

The oppositely directed axial forces occurring as a result of the helical toothings, which act on the pinion shaft 40, are designated with the reference numerals $F_R$ and $F_L$.

The pinion shaft 40 is axially biased by the springs 60, 60', as is indicated by the reference numerals $F_F$. The spring force generated by the springs 60, 60' is identical.

If the torques $T_R$ and $T_L$ are identical in both half-wing shafts 5, 5', as is the case when neither jamming nor a shaft breakage occurs, the oppositely directed axial forces $F_R$ and $F_L$ resulting from the helical toothing are equally large, i.e. in equilibrium. In this case, the pinion shaft 40 remains in the position shown in FIG. 4, i.e. stationary.

However, if there is a difference between the torques acting in the half-wing shafts 5, 5', the resulting axial forces $F_R$ and $F_L$ also become different, whereby a resulting actuating force is obtained, which initially is reacted by the springs 60, 60'. If the torque difference becomes greater, this leads to an axial displacement of the pinion shaft 40, which is so great that one of the sensors or switches 70, 70' is actuated. Alternatively or in addition, it can be provided that a mechanical brake not shown in the Figure is activated.

Upon actuation of one of the sensors or switches 70, 70', the drive unit 1 is shut down or blocked by the mechanical brake. In both cases, a further increase of the shaft torque in the half wings is prevented.

The same is true for a shaft breakage, which leads to a torque decrease in the half wing concerned. In this case, too, the drive unit 1 can be shut down or blocked. At the same time, the signal of the actuated sensor 70, 70' can be utilized, in order to activate safety brakes, which for instance are arranged at the wing tips, in order to lock the system in a safe condition. However, a special case occurs when both shaftings are blocked at the same time. In this case, there is no torque difference, so that no fault can be detected. However, the driving torques to be absorbed in the transmissions preferably are limited to 50% of the torque capacity of the drive unit, as in the case of an asymmetric load branching a difference of the torques again becomes effective.

Figure 4:
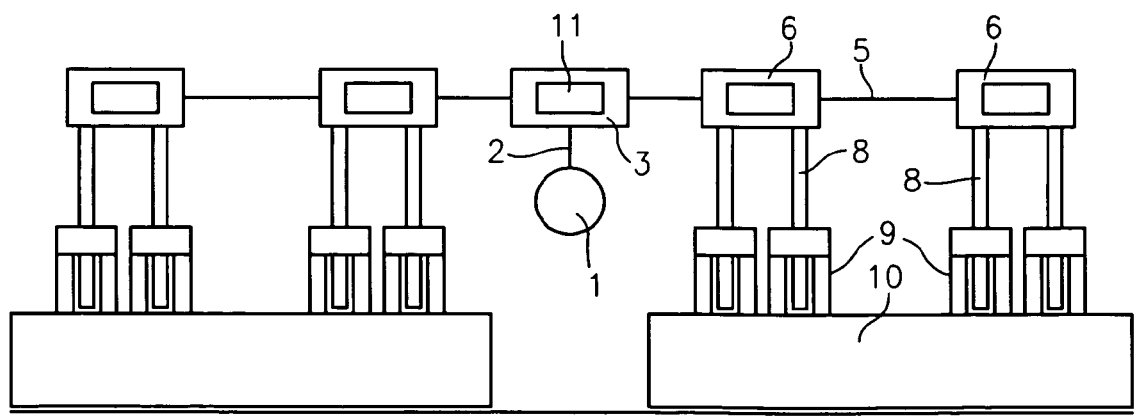
FIG. 4: shows a schematic representation of a drive system in accordance with the present invention with redundant load paths.

With the topology illustrated in the Figures, the following advantages are achieved:
- elimination of a multitude of station and half-system torque limiters
- distinctly reduced shaft torques in the jamming case
- early detection of interruptions in the shafting
- lower system procurement costs
- lower system operating costs (maintenance)
- increased system reliability FIG. 4 shows a drive system in accordance with the present invention with redundant load paths. As can be taken from FIG. 4, two actuators 8 and two guide transmissions 9 each are associated to a branch transmission 6. In principle, it would also be conceivable to provide another number of guide transmissions as actuators. In this case, the use of a guide transmission would for instance also be conceivable. The invention is of course not limited to two actuators and guide transmissions, and another number also is conceivable in principle. As can furthermore be taken from FIG. 4, comparators are arranged in the branch transmissions 6, which are configured as a mechanically operating component 11. In a preferred aspect of the invention, the comparators are the arrangements shown in FIG. 3.

By integrating this arrangement in each of the branch transmissions 6, the above-mentioned force conflict can be solved in the closed torque circuit. This is due to the fact that the force conflict in the transmissions produces torques with different signs. This torque difference can be compensated by an axial movement of the pinion shaft 40 shown in FIG. 3, in that during the axial movement of the pinion shaft 40 the spur gear subjected to a higher load stays back by the pitch of the helical toothing, whereas the wheel subjected to a lower load experiences a lead.

Since the torque circuit is closed, the torque compensation is obtained by the softnesses of the system. It should be noted that the stiffer the load paths, the less angular difference must be generated by the device. Only when a maximum admissible difference of the torques is exceeded, will a shutdown be effected via the switches 70, 70'.

Another safety requirement typical for aviation consists in that a failure of one of the load paths arranged in parallel must safely be detected (prohibition of "sleeping faults"). In solutions known from the prior art, electric sensors or also mechanical displays are used for this purpose.

The arrangement shown in FIG. 4 also detects torque differences initiated by jamming or an interruption of one of the load-bearing paths in the drive station. This is conceivable by using the mechanical device as shown in FIG. 3 and also with electric torque sensors. Thus, the arrangement as shown in FIG. 4 is not limited to the use of mechanical comparators.

In the case of both load paths jamming at the same time, 50% of the driving torque must be absorbed per load path also in this arrangement. In terms of safety, the simultaneous breakage of both load paths is negligeable, as in the system design this case is excluded by other measures, for instance by dissimilarity.

In the embodiment with redundant load paths as shown in FIG. 4, all load limiters or branch transmissions 6 are equipped with torque difference sensors.

The invention claimed is:

1. An aircraft high-lift system comprising
   (i) at least one drive unit for operating the high-lift systems of a pair of half wings on opposite sides of an aircraft, and
   (ii) at least one overload protection to avoid undesirably high operating torques in the pair of half wings, wherein the overload protection includes
      (A) a comparator, by which the instantaneous values of the operating torques of the pair of half wings are compared or a condition caused by the difference of the operating torques is detected, and
      (B) a limiter connected with the comparator, by which the drive unit is blocked, shut down or deactivated or the torque of the drive unit is dissipated into the aircraft structure, when the difference of the operating torques determined in the comparator exceeds a limit value.

2. The aircraft high-lift system according to claim 1, wherein in each of the half wings at least one torque sensor is provided, which is connected with the comparator.

3. The aircraft high-lift system according to claim 2, wherein the torque sensor(s) are arranged at the root-side ends of the pair of half wines on opposite sides of an aircraft.

4. The aircraft high-lift system according to claim 1, wherein the comparator is formed by an electronic evaluation unit, which is connected with the drive unit and deactivates the same, when the electronic evaluation unit indicates that the difference of the torques exceeds a limit value.

5. The aircraft high-lift system according to any one of the preceding claims, characterized in that no torque limiters at the root of the pair of half wings are provided.

6. The aircraft high-lift system according to claim 1, wherein no torque limiters at an outlet of branching transmissions within the pair of half wings are provided.

7. The aircraft high-lift system according to claim 1, wherein the comparator and the limiter are formed by two different components.

8. The aircraft high-lift system according to claim 1, wherein the comparator is configured as a mechanically operating component.

9. The aircraft high-lift system according to claim 8, wherein the comparator is integrated in a branching transmission.

10. The aircraft high-lift system according to claim 8, wherein the comparator includes first wheels, at least one of which each is connected with a transmission shaft and which mesh with second wheels of an axially movable pinion shaft, wherein the first wheels are configured such that they exert oppositely directed forces on the pinion shaft.

11. The aircraft high-lift system according to claim 10, wherein the first wheels or the second wheels are helical spur gears.

12. The aircraft high-lift system according to claim 10, wherein springs are provided, which act in opposite directions and by which the pinion shaft is biased.

13. The aircraft high-lift system according to claim 10, wherein one or more sensors are provided, by which an axial deflection of the pinion shaft or of a component connected with the same can be detected.

14. The aircraft high-lift system according to claim 10, wherein one or more brakes are provided, which in the case of an axial deflection of the pinion shaft are actuated beyond a limit value and by which the drive unit can be blocked.

15. The aircraft high-lift system according to claim 10, wherein the sensor(s) are connected with brakes which fix the pair of half wings or parts thereof in a safe condition, when a sensor signal is issued.

16. The aircraft high-lift system according to claim 1, wherein redundant load paths are provided and that in a branching transmission, from which the redundant load paths extend, the comparator is arranged.

17. The aircraft high-lift system according to claim 16, wherein the comparator includes first wheels, at least one of which each is connected with a transmission shaft and which mesh with second wheels of an axially movable pinion shaft, wherein the first wheels are configured such that they exert oppositely directed forces on the pinion shaft.

18. The aircraft high-lift system according to claim 16, wherein the comparator is formed by an electronic evaluation unit.

19. The aircraft high-lift system according to claim 1, wherein the comparator and the limiter are formed by one and the same component.

20. The aircraft high-lift system according to claim 1, wherein the comparator and the limiter are formed by an assembly.

* * * * *